United States Patent
McClard

(10) Patent No.: US 6,438,752 B1
(45) Date of Patent: Aug. 20, 2002

(54) METHOD AND SYSTEM FOR SELECTING TELEVISION PROGRAMS BASED ON THE PAST SELECTION HISTORY OF AN IDENTIFIED USER

(75) Inventor: Anne P. McClard, Lafayette, CO (US)

(73) Assignee: MediaOne Group, Inc., Englewood, CO (US)

( * ) Notice: Subject to any disclaimer, the term of this patent is extended or adjusted under 35 U.S.C. 154(b) by 0 days.

(21) Appl. No.: 09/338,315

(22) Filed: Jun. 22, 1999

(51) Int. Cl.[7] .............................. H04N 5/445; G06F 3/00; G06F 13/00
(52) U.S. Cl. .............................. 725/46; 725/44; 725/45; 348/732; 348/734; 348/731
(58) Field of Search .............................. 345/327; 348/1, 348/2, 10, 12, 553, 563, 569, 570, 731, 732, 906, 734; 725/35, 45, 46, 50, 57, 44, 56

(56) References Cited

U.S. PATENT DOCUMENTS

| | | | |
|---|---|---|---|
| 3,849,729 A | | 11/1974 | Van Baggem |
| 4,972,503 A | | 11/1990 | Zurlinden |
| 5,444,499 A | * | 8/1995 | Saitoh ........................ 348/734 |
| 5,585,865 A | * | 12/1996 | Amano et al. ............... 348/731 |
| 5,594,509 A | * | 1/1997 | Florin et al. ................. 348/731 |
| 5,630,203 A | | 5/1997 | Weinblatt |
| 5,666,645 A | | 9/1997 | Thomas et al. |
| 5,721,583 A | * | 2/1998 | Harada et al. ................ 348/12 |
| 5,734,444 A | * | 3/1998 | Yoshinobu ................... 348/731 |
| 5,737,029 A | * | 4/1998 | Ohkura et al. ............... 348/564 |
| 5,758,257 A | * | 5/1998 | Herz et al. ...................... 455/2 |
| 5,798,785 A | * | 8/1998 | Hendricks et al. ............. 348/1 |
| 5,801,747 A | * | 9/1998 | Bedard ........................... 348/1 |
| 5,903,314 A | * | 5/1999 | Niijima et al. ............... 348/564 |
| 5,977,964 A | * | 11/1999 | Williams et al. ............ 345/327 |
| 6,133,909 A | * | 10/2000 | Schein et al. ............... 345/327 |

* cited by examiner

Primary Examiner—Andrew Faile
Assistant Examiner—Ngoc Vu
(74) Attorney, Agent, or Firm—Brooks, Kushman P.C.

(57) ABSTRACT

A system and method for selecting programs based on the past selection history of an identified user that allows the identified user to "surf" directly between desired programs. The system includes a head-end server operable to receive program signals from a programming source, and a user input apparatus, such as a remote controller, which is operable to generate an input signal indicating the identity of a user and an input signal indicating a degree of a selection preference. The system further includes at least one set-top box having a program receiver to receive the program signals from the head-end server, and a user input receiver for receiving the input signals from the user input apparatus. The set-top box also includes a memory to store the past selection history of the identified user, and a processor for determining which channel is currently assigned to a program corresponding to the degree of the selection preference of the identified user for the time period the input signal indicating the degree of the selection preference is received. The set-top box further includes a tuner operable for automatically tuning the program receiver to the determined channel. If the program assigned to the determined channel is not acceptable to the user, the process may be repeated for a different selection preference or for a different degree of the same selection preference.

16 Claims, 4 Drawing Sheets

METHOD AND SYSTEM FOR SELECTING TELEVISION PROGRAMS BASED ON THE PAST SELECTION HISTORY OF AN IDENTIFIED USER

TECHNICAL FIELD

The present invention relates to a method and system for allowing a user to browse through programs which are likely to be of interest to the user based on the user's past selection history.

BACKGROUND ART

Presently, to select a program, many users "channel surf", or sequentially select each channel, until they find a channel that has a desirable program. However, as the number of available channels continues to grow, channel surfing has become an increasingly inefficient method for users to find a channel. In particular, channel surfing has been especially problematic in connection with a cable television system, which may have more than a hundred channels.

In an attempt to address this problem, some cable television networks dedicate a specific channel to serve as an electronic program guide. Alternatively, an electronic program guide can be superimposed over a current channel as described, for example, in U.S. Pat. No. 5,635,978 to Alten et al. Because of the relatively large number of television channels available to a viewer, and since only a few channels can be displayed at one time, it takes a relatively long time to complete one cycle of channels on an on-screen electronic program guide. Furthermore, since the on-screen program guide only provides a limited amount of information about the program (often just the title), it is often not possible for a viewer to ascertain whether or not they are interested in a program from viewing the on-screen electronic program guide. Moreover, since television viewers prefer to actually view the programs in order to make their program selection, they usually move back and forth between the on-screen electronic program guide and the programs wished to be viewed, making the selection of a television program very cumbersome.

Compounding the above problems with program selecting, is the fact that even with such a wide range of programs available, viewers usually prefer selected subsets (i.e., programs of a particular genre) of available programing at regularly recurring times of the day or week. In fact, it is quite common for a viewer to view the same program each day or week.

To overcome the above problems, systems have been provided which include television remote controls with the capability of programming in a limited number of favorite channels. However, the programming of these remotes is relatively complicated. This prevents many less technically oriented viewers from programming their remotes. Also, as viewer's preferences change, the viewer has to change the programmed channels accordingly to reflect the changes in the viewer's preferences. Another problem with these remotes is that they are inefficient in that they do not take into account the changes in viewer preferences throughout the day. For instance, if a programmed channel shows a program of a particular genre of interest at a first time during a day or week but not at a second time, the viewer when using the programmed favorite channels function at the second time of the day is actually burdened by having to view an undesirable program. Moreover, since these programmable remotes only store one set of favorite channel settings, these programmable remotes need to be reprogrammed each time a different viewer, such as another member of the household, wishes to use the remote to reflect the viewer's own viewing preferences.

Accordingly, it would be desirable to provide a system which allows each individual user to quickly and easily browse through programs of particular interest to them, regardless of the time of day or week.

DISCLOSURE OF INVENTION

Therefore, it is an object of the present invention to provide an improved method and system for individualized content-based program selection.

It is a further object of the present invention to provide a method and system for allowing a television viewer to readily browse through programs which they are likely to be interested in.

It is a still further object of the present invention to provide a method and system for allowing a television viewer to readily browse through programs which they are likely to be interested in, regardless of time of day or week.

It is another object of the present invention to provide a remote controller which can be personalized to individual viewers' viewing preferences with very little action on the viewer's part.

Accordingly, a method is provided for selecting programs based on the past selection history of a user. The method comprises receiving an input signal indicating the identity of the user and receiving a first input signal from the identified user indicating a first selection preference. The method further comprises determining which channel is currently assigned a program corresponding to the highest reception frequency for the first selection preference in the past reception history of the identified user for the current time period, and automatically tuning to the channel determined to have the highest reception frequency.

In a preferred embodiment, the user is a television viewer and the method further includes displaying the program currently showing on the channel determined to have the highest reception frequency on a television monitor.

In carrying out the method of the present invention, a system for selecting programs based on the past selection history of a user is provided. The system includes a head-end server operable to receive program signals from a programming source, and a user input apparatus operable to generate an input signal indicating the identity of the user and an input signal indicating a degree of a desired selection preference. The system further includes at least one set-top box in communication with the head-end server and the user input apparatus. The at least one set-top box includes a program receiver to receive the program signals from the head-end server, and a user input receiver to receive the input signals from the user input apparatus. The system further includes a memory to store the past selection history of the identified user, a processor for determining which channel is currently assigned a program corresponding to the degree of the desired selection preference of the identified user for the time period in which the input signal indicating the degree of the selection preference is received, and a tuner operable to automatically tune the program receiver to the determined channel.

The above objects and other objects, features, and advantages of the present invention are more readily understood from a review of the attached drawings and the accompanying specification and claims.

BEST MODE FOR CARRYING OUT THE INVENTION

Figure 1:
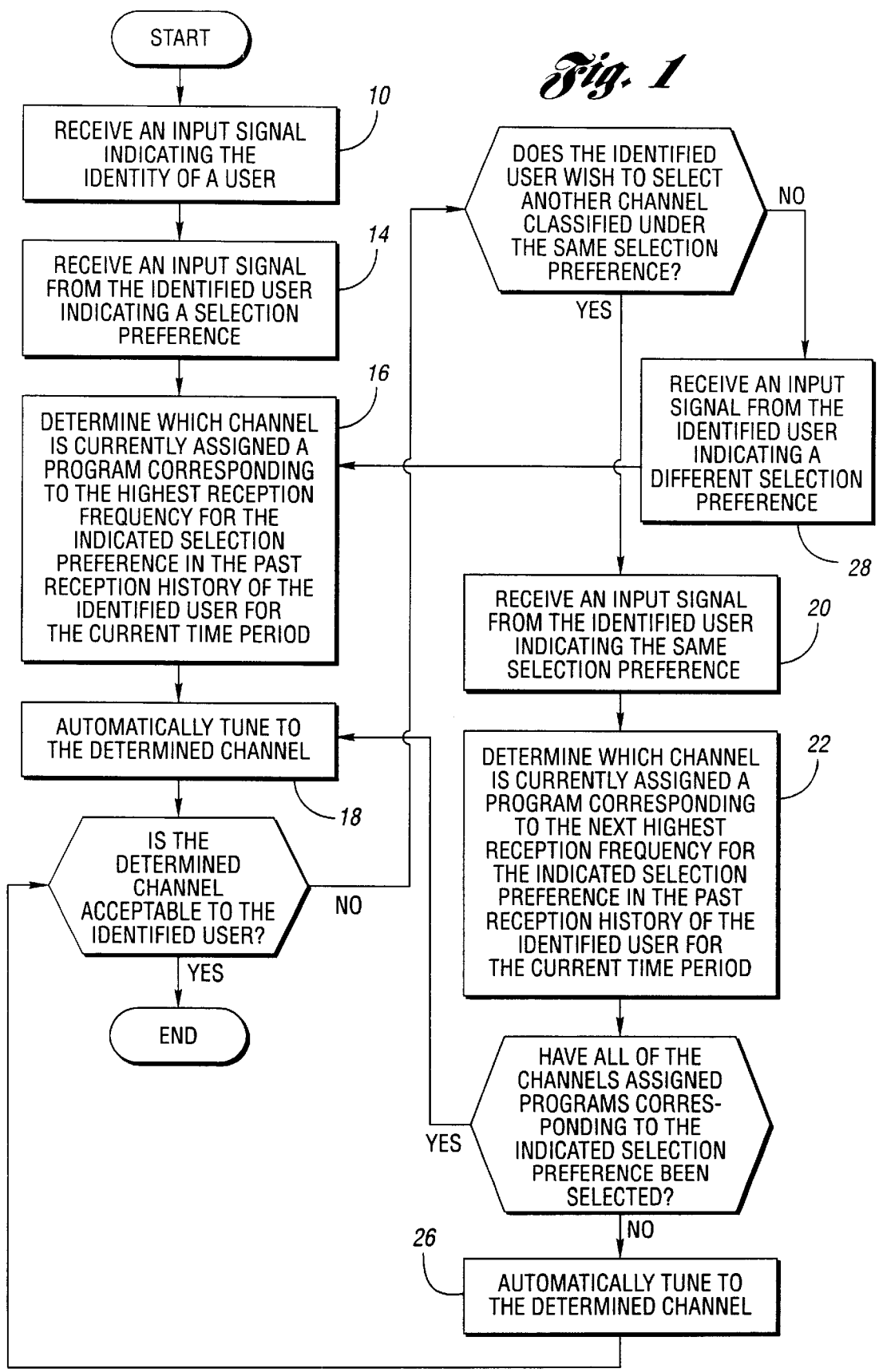
FIG. 1 is a flow diagram outlining the general method of the present invention.

Referring to FIG. 1, a flow diagram outlining the general method of program selection based on the past selection habits, or history, of an identified user is illustrated. The method includes receiving an input signal indicating the identity of the user, as shown in block 10 in FIG. 1. Next, the method includes receiving a first input signal indicating a first selection preference, as shown in block 14. Preferably, the selection preferences of the present invention are "favorite channels" and "favorite categories", as will be explained further below. However, it is contemplated that other selection preferences may also be employed. As shown in block 16, the method next includes determining which channel is currently assigned a program corresponding to the highest reception frequency for the first selection preference in a past reception history of the identified user for the current time period.

In a preferred embodiment, the user is a television viewer and the method further includes automatically tuning to, and displaying on, a television monitor the determined channel as shown in block 18.

If the user determines that the determined channel is not acceptable, the method further includes receiving at least another input signal from the identified user, as shown in FIG. 1. The type of input signal depends on what type of selection preference the identified user is interested in. In the present invention, the identified user can either select another channel classified under the first (i.e., same) selection preference ("favorite channels" for instance) or, alternatively, can select a channel classified under a second (i.e., different) selection preference ("favorite categories" for instance).

With continued reference to FIG. 1, if the identified user wishes to select another channel classified under the first selection preference, such as "favorite channels", the method then includes receiving a second input signal from the identified user indicating the first selection preference, as shown in block 20. The method then includes determining which channel is assigned a program corresponding to the identified user's next highest reception frequency for the first selection preference in a past reception history for the current time period, as shown in block 22. If the determined channel has not already been selected in response to an input signal from the identified user indicating the first selection preference, the method further includes the step of automatically tuning to the determined channel, as shown in block 26. If the determined channel had already been selected in response to the first input signal, the method further includes automatically tuning to the channel determined to be assigned to the program matching the identified user's highest reception frequency for the indicated selection preference in a past reception history for the current time period, as shown in block 18 in FIG. 1, thereby completing the cycle. In either case, if the user determines that the program assigned to the determined channel is not acceptable, the process may be repeated for the first selection preference, or for a second selection preference, as shown in FIG. 1.

Alternatively, if the identified user determines that the channel tuned to in block 18 in FIG. 1 is not acceptable and wishes to select a channel classified under a second, different, selection preference, such as "favorite categories", the method then includes receiving a first input signal from the identified user indicating a second selection preference, as shown in block 18 in FIG. 1. The method would then include determining which channel is currently assigned a program corresponding to the highest reception frequency for the second selection preference in a past reception history of the identified user for the current time period, as shown in block 16 in FIG. 1. The method then includes automatically tuning to the determined channel, as shown in block 18. The above process may be repeated as shown in FIG. 1 until the identified user locates a channel assigned a program acceptable to the identified user.

The present invention can apply equally well to users of radio, video on demand, and other systems that offer a wide variety of programs. However, the present invention is most preferably used in connection with a cable television system.

Figure 2:
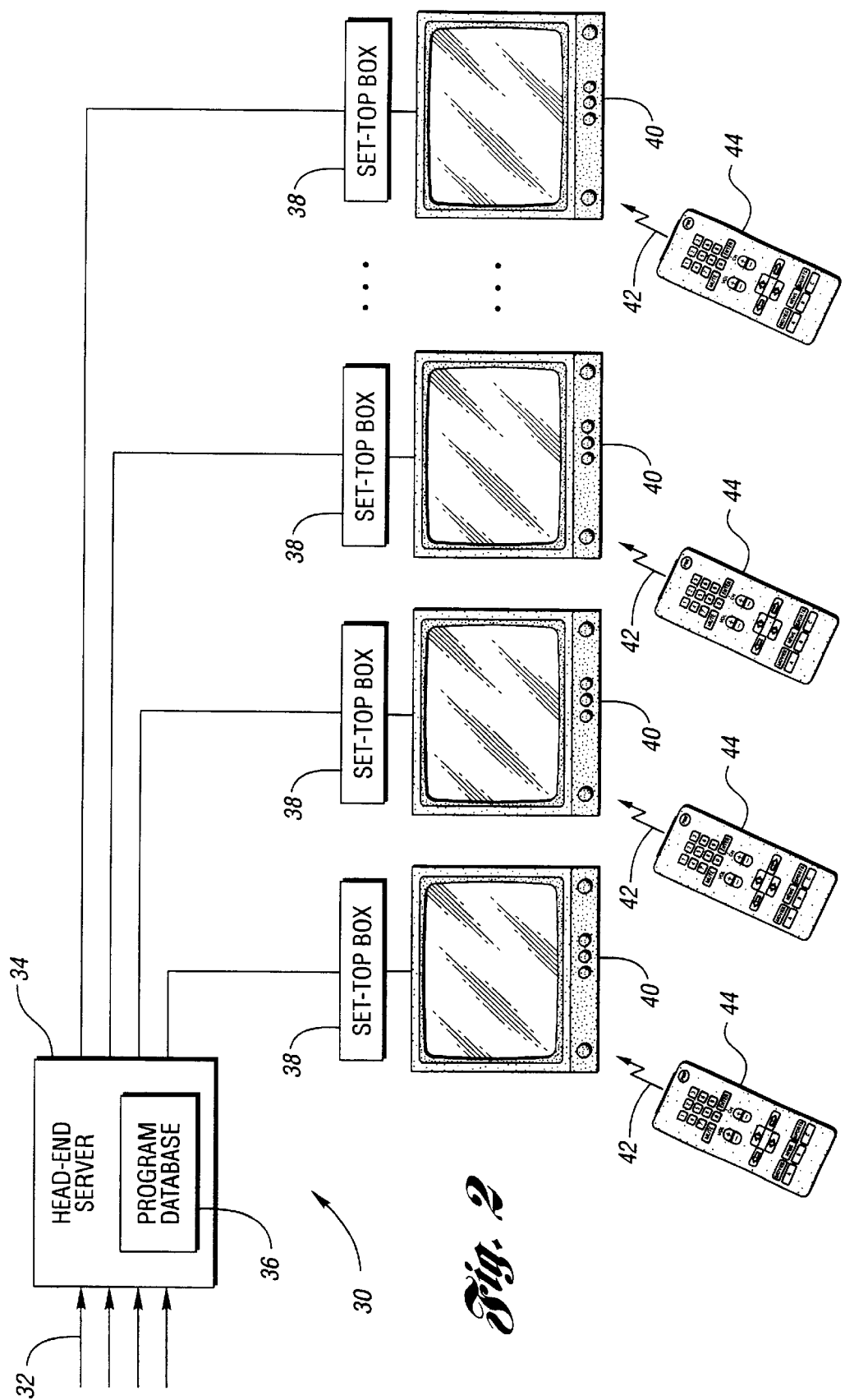
FIG. 2 is a block diagram providing an overview of the system of the present invention.

In practicing the preferred embodiment of the present invention, a cable television network 30 is utilized, as depicted in FIG. 2. Thus, in the preferred embodiment, the user is a television viewer. In operation, program signals 32 are transferred from a program source, such as an uplink (not shown), to at least one head-end server 34. Program signals 32 include video signals, audio signals, and program information for all channels available on cable television network 30. Transmission may occur via satellite or through cables, however, the system and method of the present invention are not dependent upon the particular means of transmission of reception. Head-end server 34 includes a program database 36 that stores the program information, including the running period (as determined by the program start time and end time) and the content/genre category of each program available during a particular time frame, such as a one day period.

Still referring to FIG. 2, head-end server 34 is in communication with a plurality of set-top boxes 38, and each set-top box 38 is coupled to one or more monitors, preferably televisions 40. Set-top box 38 receives program signals 32 from head-end server 34 and controls which programs are displayed on associated television 40. As an alternative to the separate housing of set-top box 38, system components could be included in another signal reception or processing device, such as a satellite receiver, a television receiver, or a VCR. Set-top box 38 is responsive to input signals 42 supplied by a viewer input apparatus, such as a remote controller 44. Of course, another type of viewer input apparatus, such as a keypad on set-top box 38, could be used to practice the present invention.

Figure 3:
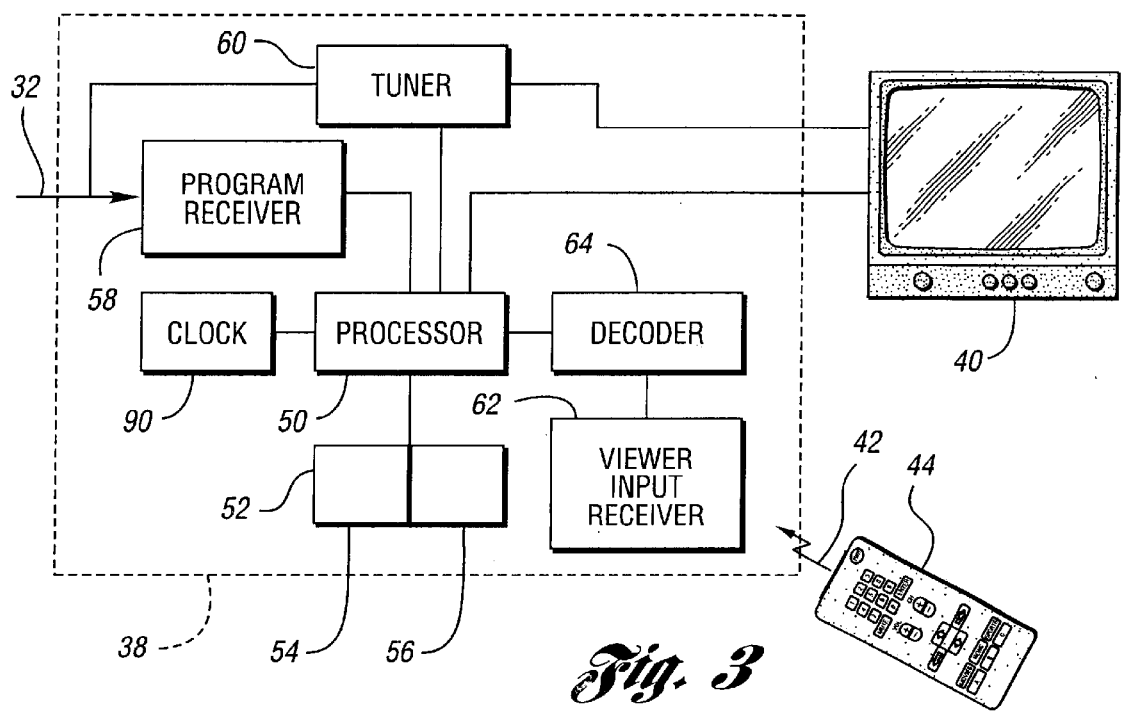
FIG. 3 is a block diagram showing a more detailed view of various components of the system of FIG. 2.

Referring now to FIG. 3, a more detailed view of the components of set-top box 38 is shown. A processor 50 in conjunction with a memory system 52 controls the operation of set-top box 38. The memory system 52 includes a program memory 54 and a frequency memory 56. Set-top box 38 further includes a program receiver 58 which operates to receive program signals 32 from head-end server 34 for all channels to which a particular viewer has access. Depending on the particular viewer, available channels may or may not include premium channels or pay-per-viiew channels. Under the control of the processor 50, program information received by program receiver 58 is stored in the program memory 54. The program information is preferably downloaded from program database 36 at head-end server 34 to set-top box 38 on a prearranged schedule, for example, at 2 a.m. each morning for the next day's programming. In addition, set-top box 38 is provided with a tuner 60 for tuning program receiver 58 to selected channels.

As shown in FIG. 3, set-top box 38 is also provided with a viewer input receiver 62 and an associated decoder 64. Viewer input receiver 62 receives input signals 42 from remote controller 44, and decoder 64 converts the input signals 42 to digital information for delivery to the processor 50 and the frequency memory 56. Under the control of the processor 50, the selection preferences, or viewing preferences of individual viewers for each time period of the day and week is determined from the viewer's input signals 42 over time and is stored in the frequency memory 56, as will be explained below in greater detail. Remote controller 44 functions in a conventional manner, transmitting signals via infrared, radio frequency, or other signaling technology. In a preferred embodiment, viewer input receiver 62 is an infrared receiver, and input signals 42 are infrared signals.

Figure 4:
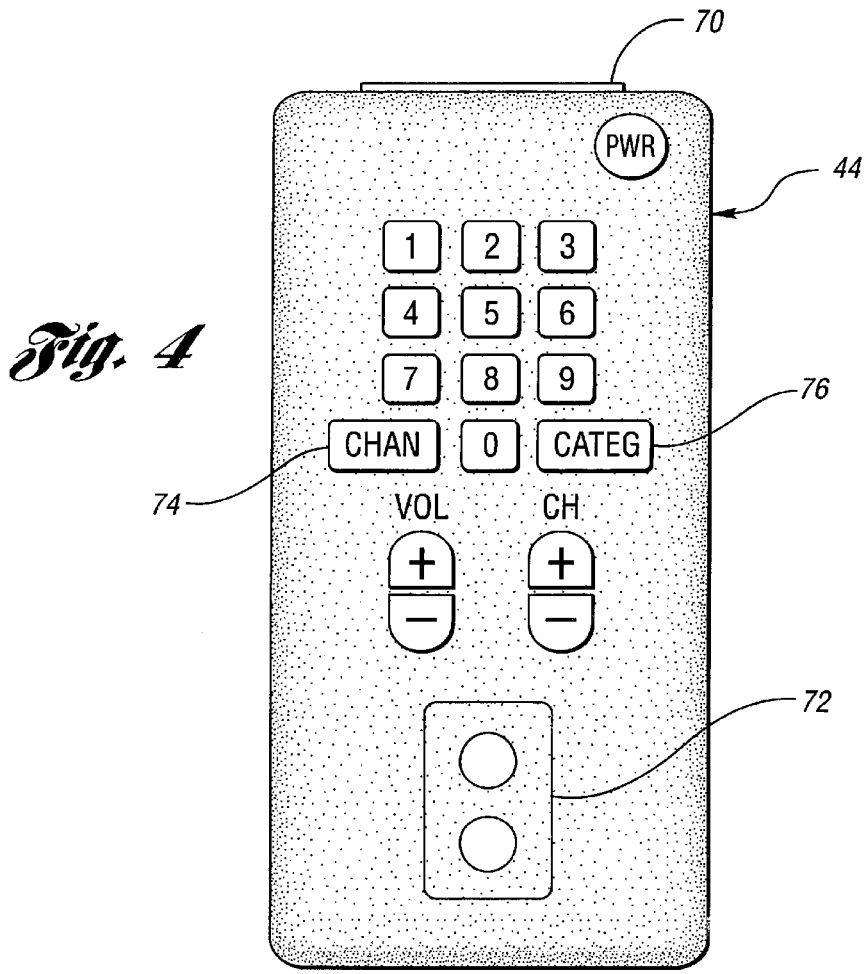
FIG. 4 depicts a preferred embodiment of a remote controller for use with the present invention.

Referring now to FIG. 4, remote controller 44 is preferably provided with an infrared transmitter 70 and a viewer identifier 72. The viewer identifier 72 can be any type of device capable of detecting the identity of a person, such as a finger print recognizer, a voice recognizer, an iris scanner, or a personal identification number (pin) recognizer. When a viewer actuates the viewer identifier 72, the viewer identifier electrically transmits an input signal to the processor 50 indicating the identity of the viewer. Each subsequent input signal is then identified as being made by the identified viewer. Remote controller 44 is also preferably provided with conventional function keys, such as power, volume, channel, and 0–9 digit keys, among others. In addition, remote controller 44 is preferably provided with two designated viewer preference keys, the "favorite channel" key 74 and the "favorite category" key 76. Upon receiving an input signal generated in response to the depression of one of the viewer preference keys 74 and 76 by an identified viewer, processor 50 functions to determine which channel is currently assigned, or showing, a program corresponding to indicated viewer preference and what order of preference the viewer would prefer to watch the determined programs (i.e., which of the programs would the identified viewer most likely prefer to view).

Figure 5:
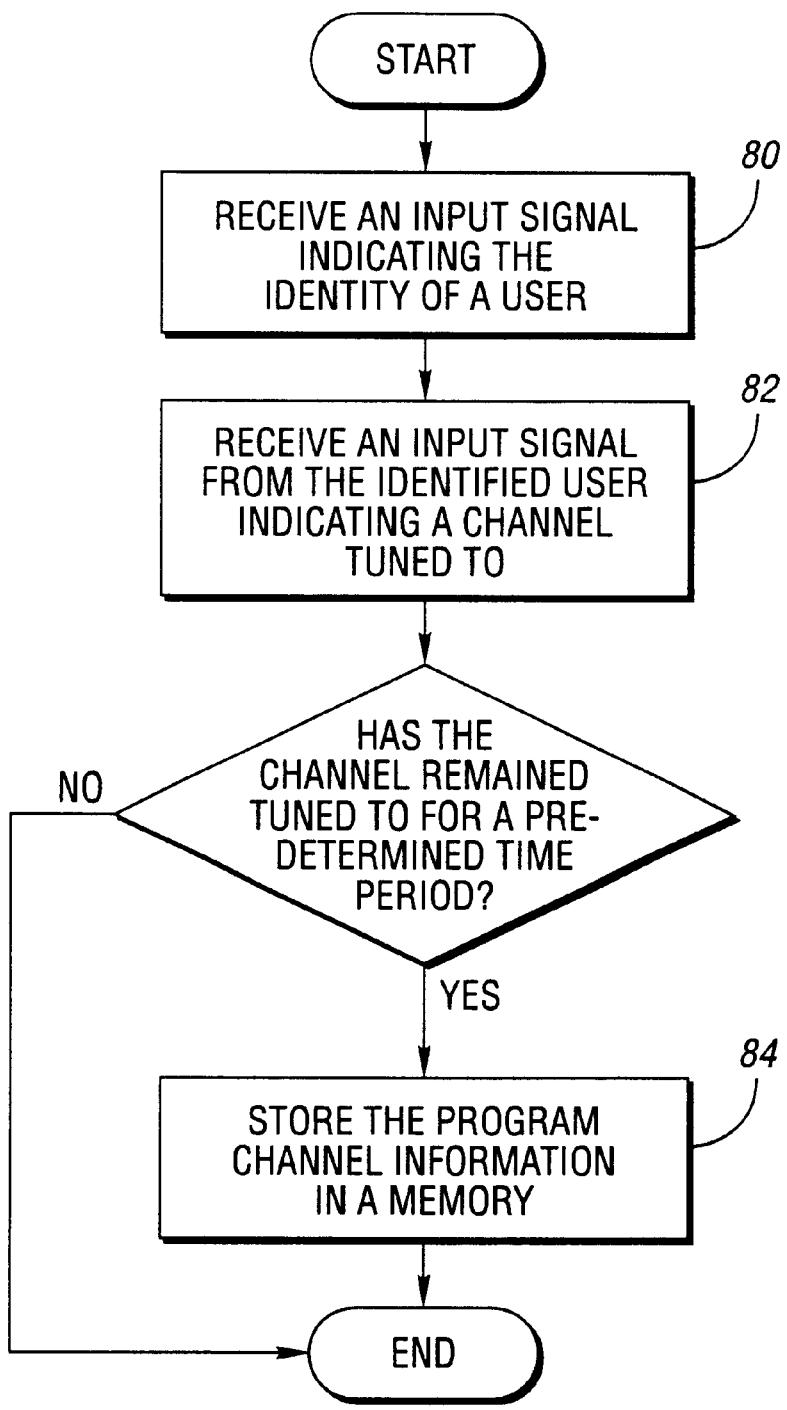
FIG. 5 is a flow diagram outlining the general method of an aspect of the present invention.

Before the present invention can determine which channel to select in the determining steps, as shown in blocks 16 and 22 in FIG. 1, at least some level of the identified viewer's past reception history must already have been learned. Each viewer's past viewing history, or preferences, is generated or "learned" over time based on the input signals transmitted by each identified viewer. Referring to FIG. 5, a flow diagram outlining the general method of determining the identified viewer's past viewing history is illustrated.

The method includes receiving an input signal from a viewer indicating the identity of the viewer, as shown in block 80. Next the method includes receiving an input signal from the identified viewer indicating the tuning to of a channel, as shown in block 82. If the channel remains tuned to for at least a predetermined time period, such as ten or fifteen minutes, the program and channel information is stored in a memory, as shown in block 84, thereby updating the identified viewer's past reception history every time a program is viewed for at least the determined time period. The program information includes the type/genre of the program and staring and ending time of the program. The channel information includes the channel number the program is displayed on.

Essentially, each time a viewer, after having been identified by the viewer identifier 72, transmits an input signal 42 to select a channel, the processor 50, in addition to directing the tuner 60 to tune program receiver to the channel selected by the viewer, determines what type or genre the program is, as well as the running time of the program, from the program memory 54. If the channel remains tuned to for at least the predetermined period of time, the processor 50 then stores the running time of the program, and day of week of the program, the channel the program is displayed on, and the program genre of the program in the frequency memory 56. Over time, a statistical model of each identified viewer's viewing preferences for each time of day of the week is developed. Thus, the statistical model is updated each time an identified viewer transmits an input signal 42 to select a channel and watches that channel for a predetermined time period.

After receiving an input signal 42 generated in response to the depression of one of the designated viewer preference keys 74 or 76 by an identified viewer, the processor 50 determines which channel has a program corresponding to the identified viewer's highest reception frequency for the indicated viewing preference in a past reception history for the current time period (i.e., the current time of the day and week). To determine which programs are currently showing, the processor 50 (FIG. 3) searches the program information stored in program memory 54 to identify a set of all of the programs which have a running period which includes the current time, as provided by clock 90. Depending upon which viewer preference key 74 or 76 has been depressed, the processor 50 then searches the frequency memory 56 to identify the identified viewer's viewing preference for the current time period.

If the favorite channel key 74 has been depressed, the processor 50 searches the frequency memory 56 to determine the order of preference of channels the identified viewer watches for the current time period. More specifically, the processor 50 searches the frequency memory 56 to determine which channel has the highest frequency (i.e., incident) of viewing by the identified viewer in the identified viewer's past reception history during the current time period.

If it is determined that a channel other than the one currently tuned to has the highest past reception frequency for the current time period, the processor 50 directs the tuner 60 to automatically tune program receiver 58 to the determined channel. If the viewer is not satisfied with the program showing on the determined channel, the viewer can again depress the favorite channels key 74 on remote controller 44, causing the process to be repeated. In this case, processor 50 will determine which channel has the next highest reception frequency in the identified viewer's past reception history, and then direct tuner 60 to tune program receiver 58 to the determined channel. This process can be repeated until the identified viewer has found an acceptable channel, or until the viewer depresses the favorite categories key 76. If the process is repeated after the channel having the lowest reception frequency in the identified viewer's past reception history for the current time period has been viewed, the tuner 60 will default back to the channel having the highest reception frequency in the identified viewer's past reception history for the current time period, (i.e., the first channel selected).

If the viewer preference key that has been depressed is the favorite categories key 76, the processor 50 searches the frequency memory 56 to determine the order of preference of the categories/genres of programs the identified viewer watches for the current time period. In this case, the identified viewer's favorite categories are mapped out based on the identified viewer's reception frequency of programs having a particular content or being of a particular genre. Example of definable genres include, but are not limited to, sports, news, movies, music, soap operas, and cooking programs. Each of these genres are further divisible into different definable types. For instance, sports can include the following types: baseball, hockey, football, etc.

The processor 50 then checks the frequency memory 56 to determine which programs, from the set of programs currently showing, are of the genre that is the identified viewer's favorite genre for the current time period. If more than one channel is currently showing a program of the genre determined to be the identified viewer's favorite genre for the current time period, the processor 50 then checks the frequency memory 56 to determine which of the programs identified as being of the identified viewer's favorite genre corresponds to the identified viewer's preferred type of this favorite genre, based on the identified viewer's past viewing history (i.e., based on the highest reception frequency in a past viewing). The tuner 60 then directs the program receiver 58 to receive the determined channel.

If the viewer is not satisfied with the program showing on the determined channel, the viewer can then again depress the favorite categories key 76 on remote controller 44 causing the above process to repeated. The processor 50 then checks the frequency memory 56 to determine which of the currently showing programs would have the next highest reception frequency for the current time period based on the identified viewer's past reception history of his favorite genres for the current time period. After the program having the lowest reception frequency for the first genre has been displayed, the processor 50 then checks the frequency memory 56 to determine what is the next highest reception frequency genre of the identified viewer and then checks to determine which program would be the highest reception frequency program for the second highest reception frequency genre. This process can be repeated until the identified viewer either accepts a program showing on a determined channel or depresses the favorite channel key 74, initiating the favorite channel process described above. If the process is repeated after the program having the lowest reception frequency for the lowest reception frequency genre for the current time period has been viewed, the tuner 60 will default back to the channel showing the program corresponding to the highest reception frequency for the genre determined to have the highest reception in the identified viewer's past reception history for the current time period, (i.e., the first channel selected).

Therefore, using the system and method of the present invention, viewers can easily surf between channels currently showing programs of a desired content category or channel. For example, if a viewer were to press his favorite channel key 74 on the remote controller 44 at 9:15 p.m. on a given night, set-top box 38 would receive an input signal 42 at the viewer input receiver 62. Input signal 42 would be decoded by decoder 64 to determine the viewer preference desired, in this example "favorite channels" and that information would be sent to processor 50. Using the program information stored in program memory 54 and the identified viewer's past viewing history stored in frequency memory 56, processor 50 would then determine which channel is the identified viewer's most preferred channel at the current time of 9:15 p.m for the given night. Processor 50 would then send the determined channel number to tuner 60, and tuner 60 would automatically tune program receiver 58 to the determined channel. If the program showing on the determined channel was not acceptable to the viewer, the viewer could depress the favorite channel key 74 again and the process would be repeated to determine the next most preferred channel, or, alternatively, the viewer could depress the favorite category key 76 to determine the most preferred program based on category/genre.

If the viewer were to depress the favorite category key 76 on remote controller 44 at 9:15 p.m. on a given night, set-top box 38 would receive an input signal 42 at viewer input receiver 62. Input signal 42 would be decoded by decoder 64 to determine the viewer preference desired, in this example "favorite categories", and that information would be sent to processor 50. Using the program information stored in program memory 54 and the identified viewer's viewing habits stored in frequency memory 56, processor 50 would then determine which of the channels were showing programs which would be of interest to the identified viewer based on the viewer's past viewing history at the current time of 9:15 p.m.

If a plurality of channels were determined, processor 50 would then determine which channel is showing a program matching the identified viewer's highest reception frequency for the given time period based on genre. Processor 50 would then send the determined channel number to tuner 60, and tuner 60 would automatically tune program receiver 58 to the determined channel. Thus, if at 9:15 p.m. a baseball game, a hockey game and a news program were showing, and the frequency memory indicated that at 9:15 p.m. the identified viewer's favorite genre is sport, then within that genre, the identified viewer's favorite type of sports programs to watch is baseball, the channel showing the baseball game would then be sent to the tuner 60 by the processor 50, and tuner 60 would automatically tune program receiver 58 to the channel determined to be showing the baseball game.

If the baseball game was not acceptable to the viewer, the viewer could depress the favorite categories key 76 again and the process would be repeated and the channel number showing the hockey game would be sent by the processor 50 to the tuner 60, and tuner 60 would automatically tune program receiver 58 to the channel determined to be showing the hockey game. A subsequent depression of the favorite categories key 76 would result in the channel showing the news program being tuned in. A further depression of the favorite categories key 76 would result in the baseball game being tuned in again. In any event, the program and channel information of which ever program the identified viewer watches for at least the predetermined time period would be stored in the frequency memory 56 to update the identified viewer's past reception history.

It is understood, of course, that while the form of the invention herein shown constitutes a preferred embodiment of the invention, it is not intended to illustrate all possible forms thereof. For instance, the remote controller 44 could be provided with additional, or different, viewer preference keys than the favorite channel and categories keys 74 and 76, such as a "sports" key and a "news" key, to name a few. It will also be understood that the words used are words of description rather than limitation, and that various changes may be made without departing from the spirit and scope of the invention disclosed.

What is claimed is:

1. A method for selecting programs based on the past selection history of a user, the method comprising:
   receiving an input signal indicating the identity of tie user;
   receiving a first input signal indicating a selection preference of the user;
   determining which of a plurality of genres is the favorite genre for the user based on the past reception history of the identified user for the current time period;

determining which channel is currently assigned a program corresponding to the highest reception frequency for the favorite genre in the past reception history of the identified user for the current time period; and automatically tuning to only the channel determined to have the highest reception frequency for the favorite genre.

2. The method of claim 1, wherein determining which channel is currently assigned a program corresponding to the highest reception frequency includes determining all of the channels of the favorite genre that are showing a program having a running period which includes the current time period.

3. The method of claim 2, wherein determining which channel is currently assigned the program corresponding to the highest reception frequency includes searching a frequency memory containing the past reception history of the identified user.

4. The method of claim 1, wherein receiving an input signal indicating the identity of the user includes receiving a signal transmitted from a user identifier.

5. The method of claim 4, wherein a user identifier is disposed on a remote controller and is selected from the group consisting of a finger print recognizer, a voice recognizer, an iris recognizer and a personal identification recognizer.

6. The method of claim 1, wherein receiving an input signal indicating a first selection preference includes receiving a signal indicating the actuation of a favorite categories key.

7. The method of claim 1, further comprising receiving a second input signal repeating the selection preference.

8. The method of claim 7, further comprising determining which channel is currently assigned a program corresponding to the next highest reception frequency for the favorite genre in the past reception history of the identified user for the current time period and automatically tuning only to the channel determined to have the next highest reception frequency for the favorite genre.

9. The method of claim 8, wherein when there is no channel having the next highest reception frequency for the favorite genre, the method further comprises:

determining which of the plurality of genres is the next favorite genre for the user based on the past reception history of the identified user for the current time period;

determining which channel is currently assigned a program corresponding to the highest reception frequency for the next favorite genre in the past reception history of the identified user for the current time period; and automatically tuning to only the channel determined to have the highest reception frequency for the next favorite genre.

10. The method of claim 9, further comprises receiving a third input signal repeating the selection preference;

determining which channel is currently assigned a program corresponding to the next highest reception frequency for the next favorite genre in the past reception history of the identified user for the current time period; and automatically tuning to only the channel determined to have the next highest reception frequency for the next favorite genre.

11. The method of claim 1, wherein the past reception history for the identified user is determined in part by:

the reception of an input signal indicating the identity of the user;

the reception of an input signal from the identified user indicating a channel a tuner is tuned to, the channel having an assigned program; and if the channel has remained tuned to for at least a predetermined period of time, storing programming and channel information for the assigned program to the channel in a memory.

12. The method of claim 11, wherein the predetermined period of time is at least ten minutes.

13. The method of claim 11 wherein the past reception history is updated each time a channel has remained tuned to for at least the predetermined period of time.

14. The method of claim 1, wherein determining which channel is currently assigned a program corresponding to the highest reception frequency for the favorite genre comprises determining only the channel currently assigned a program corresponding to the highest reception frequency for the favorite genre in the past reception history of the identified user for the current time period.

15. A method for selecting programs for full television screen viewing using a remote control, the method comprising:

receiving a selection signal from the remote control;

determining which of a plurality of genres is the favorite genre based on the past reception history for the current time period after receiving the selection signal;

determining which channel is currently assigned a program corresponding to the highest reception frequency for the favorite genre in the past reception history for the current time period after receiving the selection signal; and automatically viewing the full television screen image of the channel determined to have the highest reception frequency for the favorite genre by automatically tuning to the channel before receiving another selection signal from the remote control.

16. A method for selecting programs based on the past selection history of a user, the method comprising:

receiving an input signal indicating the identity of the user;

receiving a first input signal indicating a selection preference of the user;

determining which of a plurality of genres is the favorite genre for the user based on the past reception history of the identified user for the current time period;

determining only the channel currently assigned a program corresponding to the highest reception frequency for the favorite genre in the past reception history of the identified user for the current time period; and automatically tuning to the channel determined to have the highest reception frequency for the favorite genre.

* * * * *

UNITED STATES PATENT AND TRADEMARK OFFICE
CERTIFICATE OF CORRECTION

PATENT NO.     : 6,438,752 B1
DATED          : August 20, 2002
INVENTOR(S)    : Anne P. McClard It is certified that error appears in the above-identified patent and that said Letters Patent is hereby corrected as shown below:

Column 8,
Line 62, delete "tie" and replace with -- the --.

Signed and Sealed this

Twenty-eighth Day of January, 2003

JAMES E. ROGAN
*Director of the United States Patent and Trademark Office*